United States Patent [19]

Adler

[11] Patent Number: 5,076,148
[45] Date of Patent: Dec. 31, 1991

[54] PISTON FOR AXIAL PISTON MACHINES

[75] Inventor: Bernhard Adler, Thalfingen, Fed. Rep. of Germany

[73] Assignee: Hydromatik GmbH, Fed. Rep. of Germany

[21] Appl. No.: 537,472

[22] Filed: Jun. 13, 1990

[30] Foreign Application Priority Data

Jun. 13, 1989 [DE] Fed. Rep. of Germany ....... 3919329

[51] Int. Cl.$^5$ .............................................. F01B 31/10
[52] U.S. Cl. .................................... 92/158; 92/181 R; 92/172; 29/888.042; 29/888.02
[58] Field of Search ............ 91/488; 92/57, 66, 70–71, 92/158–60, 181 R, 182, 184, 172; 29/888.04, 888.042, 888.044, 888.051, 516, 517; 403/274, 284–5

[56] References Cited

U.S. PATENT DOCUMENTS 3,068,563 12/1962 Reverman ........................ 29/517 X
4,546,692 10/1985 Lotter et al. ...................... 92/159 X

FOREIGN PATENT DOCUMENTS 7108800 3/1971 Fed. Rep. of Germany .
412813 6/1982 U.S.S.R. ............................ 92/112

Primary Examiner—Edward K. Look
Assistant Examiner—Thomas E. Denion
Attorney, Agent, or Firm—Scully, Scott, Murphy & Presser

[57] ABSTRACT

A piston for axial piston machines in the form of a hollow body with an axial cavity therein into which an insert is inserted and is secured axially by means of a collar in the wall of the hollow body surrounding the insert overlapping its outer end face is designed so that while ensuring simple and economical manufacture, stable support of the filler piece and a stability of the shaft of the piston is obtained. This is achieved by providing the collar by pressing the wall of the hollow body, which is longer than its final length, into a plurality of oppositely disposed recesses or into an annular recess in the insert and by cutting the piston formed in this way to length in the general region of the recesses or the annular recess.

14 Claims, 3 Drawing Sheets

PISTON FOR AXIAL PISTON MACHINES

TECHNICAL FIELD OF THE INVENTION

The invention relates to a piston for axial position machines in the form of a hollow body with an axial cavity therein into which an insert is inserted.

BACKGROUND OF THE INVENTION AND PRIOR ART

A piston of this kind, generally known as a light piston, is described and illustrated in DE-GM 71 08 800. In this known form of piston the filler piece is formed by pressing-in a section of the wall of the hollow body overlapping the free end of the filler piece to form a flange against the end face of the filler piece. However, the filler piece is not held securely enough axially between the bottom of the cavity and the flange, because first, once the flange has been formed it gives to some extent and second, owing to the relatively long curve that arises when forming the flange, the flange is like a relatively long lever arm whose axial torsional strength is relatively small. As a result of this the object of prestressing the filler piece against the bottom of the cavity using tension exerted by the flange cannot be achieved.

In DE-OS 38 04 424 it has already been proposed to secure the filler piece in the hollow body by additional indentations which are located in the central longitudinal region of the piston, and are formed by indenting the wall of the hollow body into recesses in the filler piece located beneath it. In addition, at the free end of the piston a section of the wall of the hollow body axially overlapping the filler piece is rolled-in against the end face of the filler piece, with the primary object of protecting the end wall of the lighter, and as a rule softer, material from cavitation. In this known form of piston it is true that the filler piece is held stably in the hollow body, but there is the danger of stress cracking and of fracture in the region of the indentations, especially in the case of a piston with a relatively thin cavity wall.

OBJECT OF THE INVENTION

It is an object of the invention to design a piston of the kind mentioned in the introduction in which the filler piece is stably secured and the shaft of the piston is stable, and which is simple and economical to manufacture.

SUMMARY OF THE INVENTION

In the piston according to the invention the collar or ridge, in contrast to the known flange, has a concave wall, as a result of which the collar is self-supporting and thus has a relatively high inherent stability, so that it can apply a relatively large torsional force against the end face of the filler piece and can thus secure the filler piece in the cavity of the hollow body without the danger of axial loosening. Since, in the piston according to the invention, the reduction in the cross-section of the piston by the collar formed according to the invention is located at the free end of the piston shaft the danger of stress cracking or fracture of the piston is obviated.

Further advantageous features of the invention which contribute to stable securing or fastening of the filler piece in the piston and provide a simple embodiment of the piston while ensuring good operation are described in the subclaims.

DESCRIPTION OF THE DRAWINGS

The invention will now be described in more detail with reference to exemplary embodiments shown in the drawings, in which.

DETAILED DESCRIPTION OF PREFERRED EMBODIMENTS OF THE INVENTION

Figure 1:
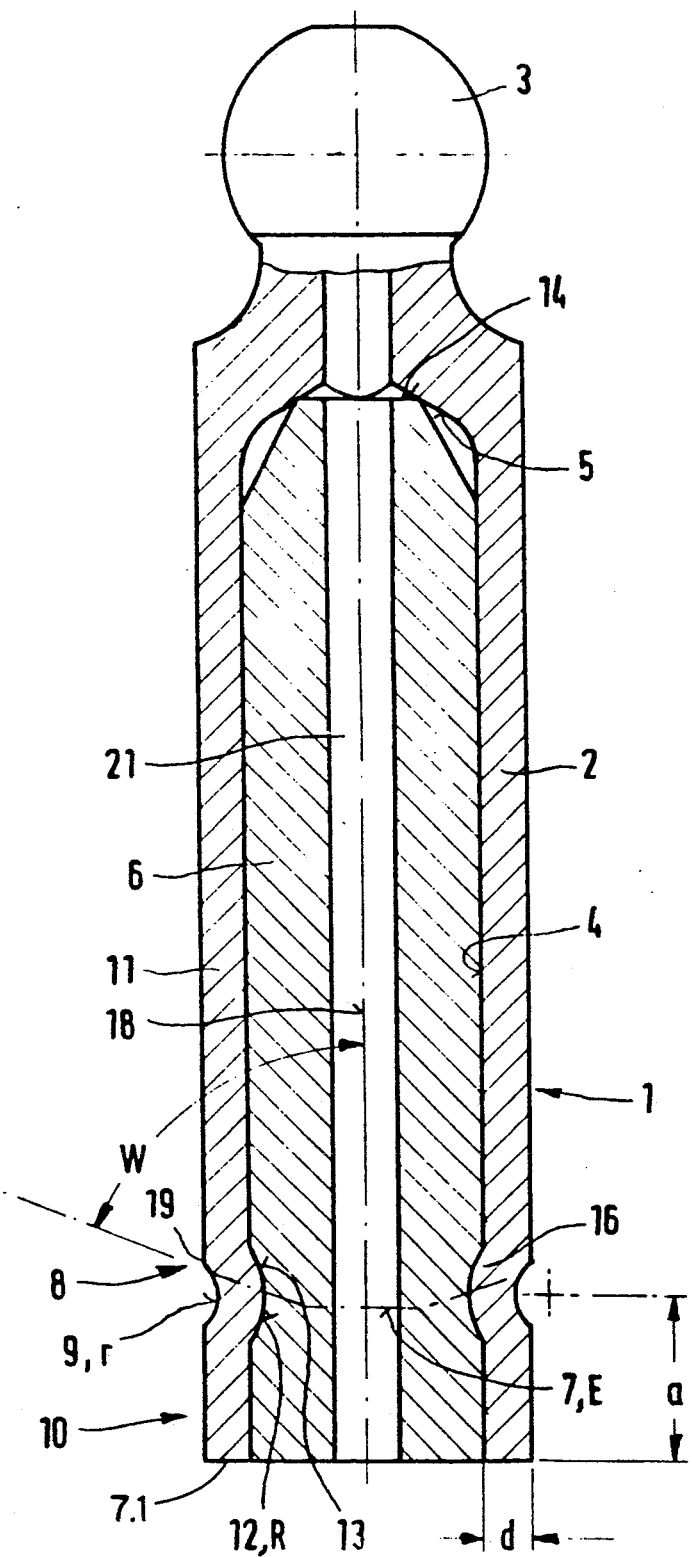
FIG. 1 shows, in axial section, a piston according to the invention.

The pistons indicated generally by 1 in the drawings each comprise a piston shaft 2 and a spherical piston head 3. A blind cavity 4, the bottom of which is indicated by 5, extends in the piston shaft 2 of circular cross-section from its free end. The piston shaft 2 is thus a hollow body. A filler piece 6 is inserted in the cavity 4 which substantially fills the cavity 4, as shown in FIG. 1, bears against the bottom 5 of the cavity 4 and extends substantially to the free end 7 of the piston 1. The filler piece 6 consists of a material having lower specific gravity than the material of the hollow body 2 which makes it possible to reduce the weight or mass of the piston 1 considerably. In the exemplary embodiment shown in FIG. 1 the filler piece 6 consists of an aluminium alloy.

For axial securing of the circular filler piece 6 which is inserted into the cavity 4, also of circular cross-section, with as little clearance as possible, for example by pressing, or with a very small tolerance, a collar indicated by 8 is provided which is formed by a bead 9 in the wall 11 of the piston shaft 2.

The collar 8 is located at the free end 7 of the complete piston 1, and it can extend in a recess or annular groove 12 in the filler piece 6 or alternatively be pressed or rolled into the surface of the filler piece 6 while forming an annular groove 12 therein. In either case, when a circular bead 9 is formed, there is an increase in the radius of curvature R of the annular groove 12 compared with the radius of curvature r of the bead 9 corresponding to the wall thickness d of the piston shaft 2.

If an annular groove 12 is provided initially it is advantageous to offset the annular groove 12 slightly relative to the bead 9 towards the free end 7 so that the bead 9 presses against the flank 13 of the annular groove 12 facing away from the free end 7, whereby the filler piece 6 presses with its inner end face 14 against the bottom 5 of the cavity 4 possibly also deforming the flank 13, and is thus braced. After forming the bead 9, which is located a short distance a from the free end 7.1 of the prefabricated piston 1, the piston 1 is cut to length in the region of the bead 9 so that a part 16 of the bead 9 facing away from the free end 7 remains on the piston 1 and then takes on the function of holding and securing the filler piece 6.

The separating plane E and the final free end 7 of the piston 1 preferably extend substantially in the half of the bead 9 remote from the piston head 3. It is advantageous if the end face is rounded or frustoconical at the free end 7, with the cone face forming an acute angle w with the longitudinal axis 18 of the piston 1, and preferably running out at the inner edge 19 of the bead 9 or a short distance c outward therefrom on the periphery of the piston shaft 2.

In the present exemplary embodiment the piston 1 has a lubricating bore 21 passing through it coaxially, which thus also extends in the filler piece 6.

Figure 2:
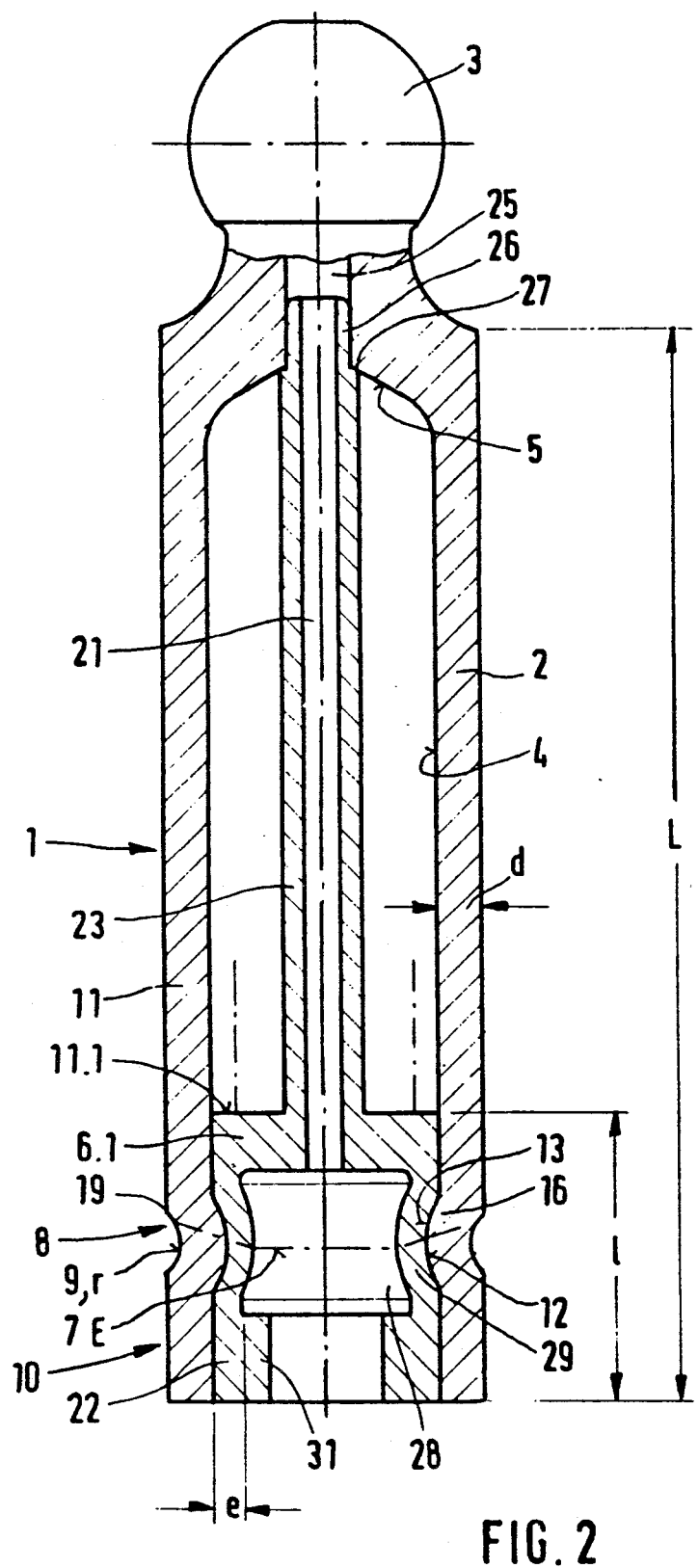
FIG. 2 shows, in axial section, a second exemplary embodiment of a piston according to the invention.

In the exemplary embodiment shown in FIG. 2 a seal or insert 6.1 is used instead of a filler piece which, at the free end 7 of the piston, has a head 22 filling the cavity 4 from which a cylindrical neck 23 of markedly reduced diameter extends axially inwardly. The neck 23 has a still narrower section 26 at its inner end that engages in the lubricating bore section 25 in the piston neck and piston head 3, with a shoulder 27 formed by the narrowing in the region of the free end of the neck 23 bearing on the bottom 5 of the cavity 4, whereby the insert 6.1 is secured against inward displacement. The length 1 of the head 22 is only a fraction of the length L of the piston shaft 2.

In addition the head 22 of the insert 6.1 has an enlarged bore 28 in its head 22 in the region of the bead 9 which is surrounded by a hollow cylindrical wall 29 that has a relatively small thickness e such that it can be bent inwards. When forming the bead 9 this wall 29 is bent inwards, as shown in FIG. 2, to provide an engagement for the collar 8 formed by the bead 9.

Within the scope of the invention it is also possible for a relatively short insert 6.1 to bear against an inner step 11.1 in the wall 11, indicated in FIG. 2, in which case the neck 23 can be dispensed with.

In the present exemplary embodiment the widened part of the bore 28 is located in the separating plane E passing through the bead 9, and at the free end of the extension 10 of the piston shaft there is a wall section 31 which is thickened relative to the wall 29 to form a step.

Figure 4:
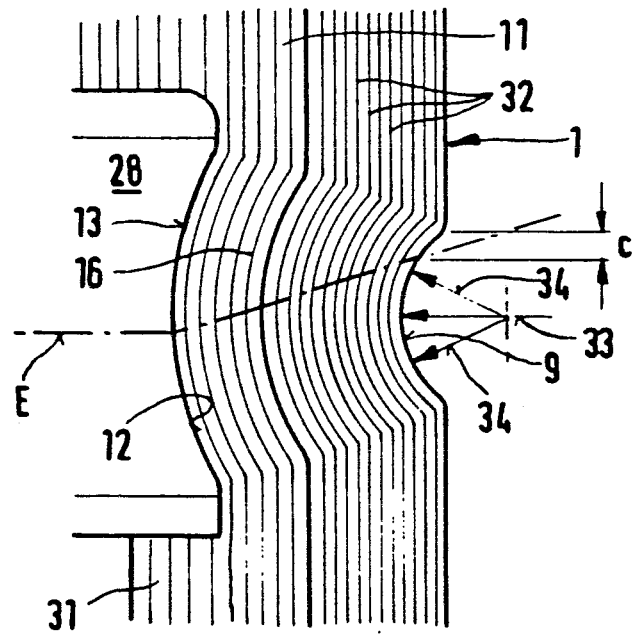
FIG. 4 shows, on a larger scale, the fiber orientation in a bead on the piston.

As can clearly be seen from FIG. 4, in the region of the bead 9 the wall 11 of the piston shaft 2, i.e. the fibers of material shown and indicated by 32, is concave, so that when forming the bead by applying force in the direction of the arrow 33 diverging components of force 34 result which press or compress the material laterally. Thus, because of their concave shape and mutual support the flanks of the bead 9 are substantially prevented from springing back.

Figure 3:
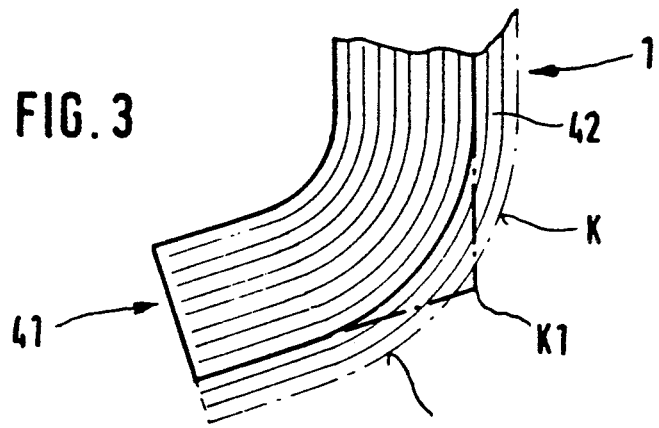
FIG. 3 shows in detail, on a larger scale, the fiber orientation in a flange on the piston.

As can clearly be seen from FIG. 3, with a flange 41 known per se, bracing of this kind against springing back after flanging does not occur. On the contrary, because of the curvature K of the bead 41 there is a relatively long lever arm, as a result of which springing back after flanging is made even easier. Furthermore, in the process of finishing the piston 1 having a flange 41, a machining allowance is removed from the cold-worked edge fibers 42 when the piston 1 is machined down to the piston contour indicated by K1.

In the arrangement according to the invention shown in FIG. 4, however, the front end of the piston 1 or the separating plane cuts transversely through the material fibers 43 in the region of the bead 9, so that the initial tension is maintained.

In all the exemplary embodiments described above the main steps in the manufacture of the piston 1 are as follows:

Manufacture of the piston shaft 2 with piston head 3 including the resulting lubricating bore section and the filler piece 6 or insert 6.1, likewise with the associated lubricating bore section.

Inserting or pressing the filler piece 6 or insert 6.1 into the cavity 4 of the piston shaft 2.

Forming the bead 9.

Cutting the piston 1 to length on the separating plane E. If necessary applying the frustoconical end face.

Machining (rolling, grinding) the outer surface of the piston shaft 2 and if necessary the surface of its free end and the piston head 2.

In the exemplary embodiments according to FIG. 2 the insert 6.1 used as a filler piece is lighter than an identical filler piece of solid material because of its recess and owing to its length. Such a filler piece 6.1 with a recess therefore does not need to consist of a light material such as, for example, aluminium or plastics material, but can be of the same material as the piston shaft 2.

What is claimed is:

1. A piston for axial piston machines in the form of a hollow body with an axial cavity therein into which an insert is inserted and is secured axially by means of a collar in the wall of the hollow body surrounding the insert overlapping its outer end face, characterized in that the collar is formed by pressing the wall of the hollow body, which is longer than its final length, into a plurality of oppositely disposed recesses or into an annular recess in the insert and by cutting the piston formed in this way to length in the general region of the recesses or the annular recess.

2. A piston according to claim 1, wherein said recesses or said annular recess are preformed or are formed in the course of pressing-in.

3. A piston according to claim 1, wherein the pressing into the recesses or annular recess is effected by rolling.

4. A piston according to claim 1, wherein said end face of said piston cut to length is convex, and in the form of a truncated cone.

5. A piston according to claim 1, wherein said insert substantially fills said cavity and consists of a material which has a lower specific gravity than the material of said hollow body.

6. A piston according to claim 4, wherein:
the hollow piston body defines an axis, and has a closed, bottom axial end and an open, top axial end;
said recesses or said annular recess are formed in a pressed-in region of the wall of the hollow body, said pressed-in region including top and bottom axial halves;
said end face includes a generally flat central area, and an outside area extending outward from the central area; and
said central area of the end face defines a plane extending through the top axial half of the pressed-in region.

7. A piston according to claim 6, wherein:
the pressed-in region of the wall of the hollow body includes a bottom annular edge; and
the outside area of the end face defines a cone that intersects said bottom annular edge.

8. A piston according to claim 6, wherein:
the pressed-in region of the wall of the hollow body includes a bottom annular edge; and
the outside area of the end face defines a cone that extends through the wall of the body at a distance above the bottom annular edge.

9. A piston according to claim 5, wherein the material of the insert is aluminum.

10. A piston according to claim 1, wherein:
the axial cavity has a given length; and
the insert includes a head section having a length shorter than said given length and bearing against an internal shoulder in the wall of the hollow body.

11. A piston according to claim 1, wherein:
the hollow body includes a bottom portion, said bottom portion forming a bottom surface of the axial cavity;
the axial cavity has a given length; and
the insert includes
  (i) a head section having a length shorter than said given length, and
  (ii) a neck connected to and extending from the head section and bearing against the bottom surface of the axial cavity.

12. A piston according to claim 1, further comprising:
a piston head connected to the hollow body; and
an axial lubricating passage extending from the piston body and through the insert.

13. A piston according to claim 11, wherein the neck of the insert includes:
a reduced cross-section portion engaged in the bottom portion of the axial cavity; and
a shoulder that abuts against the bottom surface of the axial cavity.

14. A piston according to claim 12, wherein:
said recesses or said annular recess are formed in a pressed-in region of the wall of the hollow body;
the insert includes a wall portion radially directly inside the pressed-in region of the wall of the hollow body; and
the wall portion of the insert has a thickness such that said wall portion is bent inward when the wall of the hollow body is pressed into said recesses or said annular recess.

* * * * *